United States Patent [19]

Mizusawa

[11] Patent Number: 4,705,190
[45] Date of Patent: Nov. 10, 1987

[54] DEVICE FOR HOLDING AUTOMOBILE FUEL-TANK FILLER PORT CAP

[75] Inventor: Akira Mizusawa, Yokohama, Japan

[73] Assignee: Nifco Inc., Yokohama, Japan

[21] Appl. No.: 6,369

[22] Filed: Jan. 23, 1987

[30] Foreign Application Priority Data

Jan. 28, 1986 [JP] Japan .................................. 61-14726

[51] Int. Cl.$^4$ ............................................. B65D 55/16
[52] U.S. Cl. ................................................... 220/375
[58] Field of Search ...................... 220/375, DIG. 33; 215/206; 222/543

[56] References Cited

U.S. PATENT DOCUMENTS 2,547,353  4/1951  Wiinikka .............................. 220/375
4,320,853  3/1982  Moore .................................. 220/375

Primary Examiner—George T. Hall
Attorney, Agent, or Firm—Trexler, Bushnell, Giangiorgi & Blackstone, Ltd.

[57] ABSTRACT

A device for holding a fuel-tank filler port cap includes a mounting member mounted in a through hole formed in an automobile body near a fuel-tank filler port, and a string-like connecting member inserted into and retained by the mounting member so that it can be partially withdrawn therefrom. The connecting member is provided at one end thereof with means for retaining it against detachment from the mounting member and at the other end thereof with a ring-like portion for holding the cap. The connecting member is retreated and accommodated into the interior of the automobile body through the mounting member when the cap is fitted and, when the cap is removed, is withdrawn to hold the cap in the hanging state.

3 Claims, 3 Drawing Figures

DEVICE FOR HOLDING AUTOMOBILE FUEL-TANK FILLER PORT CAP

FIELD OF THE INVENTION AND RELATED ART STATEMENT

This invention relates to a device for holding an automobile fuel-tank filler port cap connected to the automobile body.

The fuel-tank filler port of an automobile usually opens inside a recess formed by recessing the automobile body surface. The recess is covered by a lid which is usually lockable.

The covering of the filler port with the lid is mainly for thwarting thieves and ensuring safety. Since the filler port cap is covered by the lid it is usually made to be readily removable after the lid has been opened.

The cap closing the automobile fuel-tank filler port is protected by the lid so that it will not be lost even if it should come off. Sometimes, however, a gasoline station attendant or the vehicle operator forgets to replace the cap after fueling up. In such a case, the fuel is left to gasify, thus leading to a dangerous situation.

Particularly, in conventional passenger cars, the filler port cap is completely separated from the automobile body when it is removed from the port. Therefore, if a gasoline station attendant should fail to replace and tighten the cap after fuel has been supplied, the driver is liable to continue driving for a long time without knowing this and hence an extremely dangerous situation arises.

In a truck having a fuel tank mounted in an exposed state, the cap is held connected by a chain or the like to the filler port in order to avoid its loss. In this case, the chain is left dangling after the cap is replaced and tightened, and no means for accommodating the chain is provided.

When the fuel-tank filler port is within a recess covered with a lid, the chain or whatever other connecting means is used has to be accommodated. Otherwise the lid cannot be closed. This makes that the fuel supply operation is cumbersome.

OBJECT AND SUMMARY OF THE INVENTION

An object of the invention is to provide a device for holding an automobile fuel-tank filler port cap, which connects the cap to the automobile body and prevents the cap from being separated from the body when it is removed from the filler port, thus preventing loss of the cap and reducing the probability that the person who removed the cap will forget to fit and tighten it.

The holding device according to the invention comprises a string-like connecting member connecting a portion of the automobile body near the filler port and the filler port cap and means for accommodating the connecting member when the cap is replaced to close the filler port. More specifically, a through hole is formed in the car body near the filler port, a mounting member is mounted in the through hole, and the string-like connecting member is inserted in and retained by the mounting member in such manner that it can be withdrawn. The connecting member is provided at one end with retaining means and at the other end with means for holding the cap. During fitting of the cap, the string-like connecting member retreats into the interior of the automobile body through the mounting member and is accommodated there. During removal of the cap, the connecting member is drawn out as far as permitted by the retaining means to hold the cap in a hanging state.

With the device according to the invention, when the cap is fitted on the filler port to close the same, the string-like connecting member holding the cap at one end is accommodated in the interior of the automobile body through the mounting member mounted in the through hole formed in a plate-like portion of the body so that it will not hang out and prevent closing of the lid. During removal of the cap, the connecting member accommodated in the body interior is withdrawn to hold the cap in a hanging state while one end of it remains hooked on the mounting member, thus preventing the separation of the cap from the body.

The above and other objects and features of the invention will become more apparent from the following detailed description with reference to the accompanying drawings.

DETAILED DESCRIPTION OF THE PREFERRED EMBODIMENT

Figure 1:
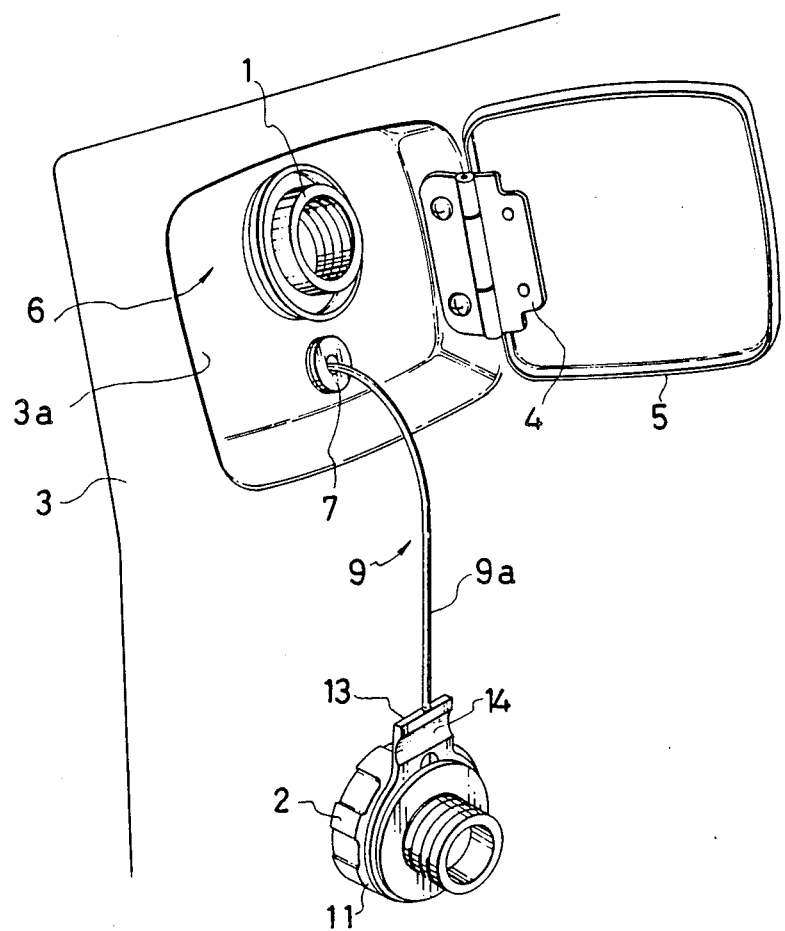
FIG. 1 is a perspective view showing an embodiment of the device for holding a fuel-tank filler port cap according to the invention, with a cap shown removed and held in a hanging state.
Figure 2:
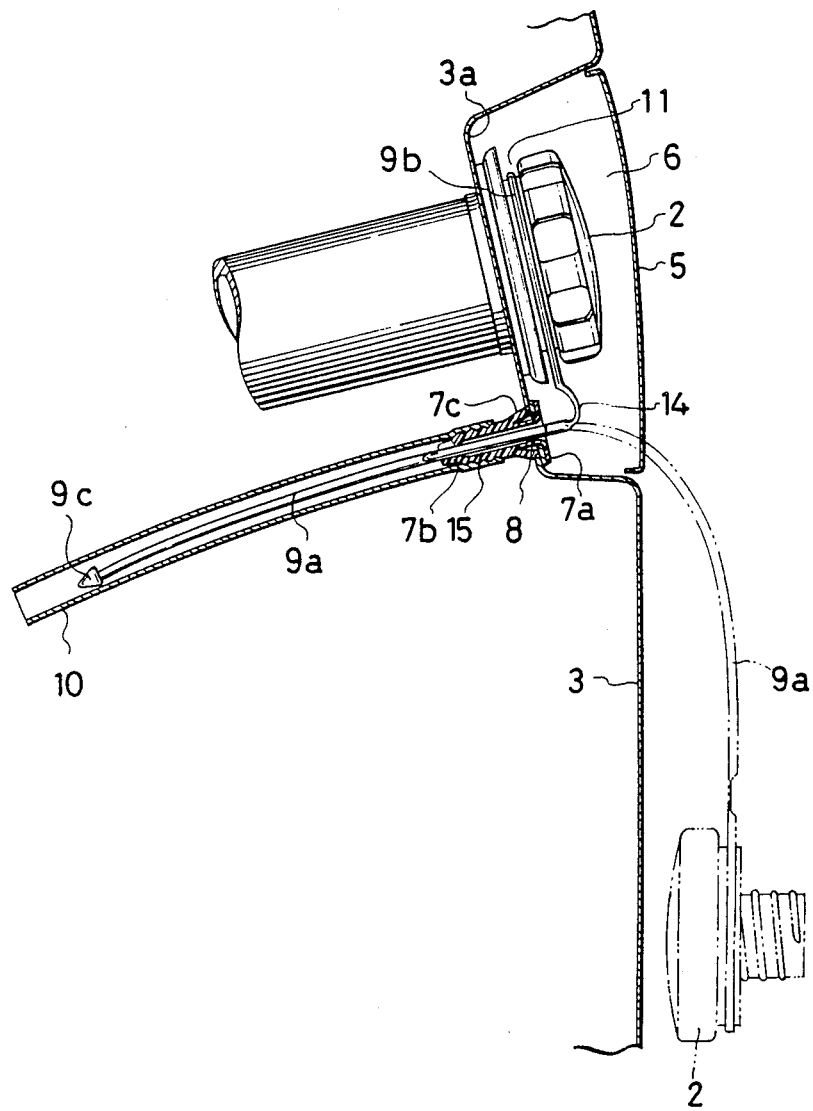
FIG. 2 is a side view, partly in section, showing the device of FIG. 1 with the cap fitted on the filler port.
Figure 3:
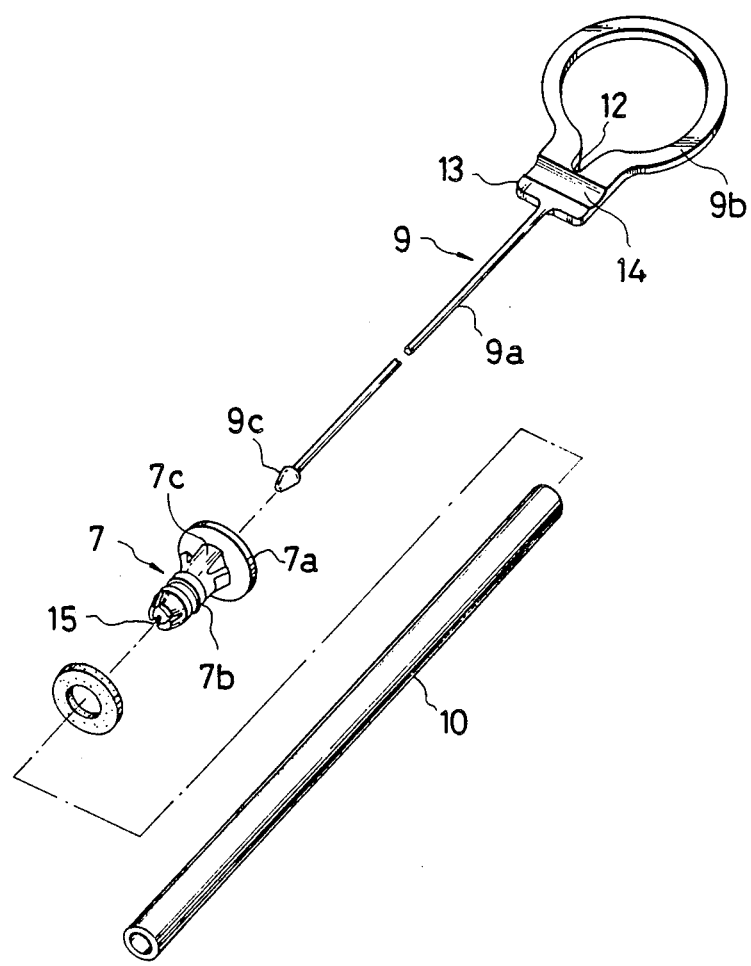
FIG. 3 is an exploded perspective view showing an essential part of the device shown in FIG. 1.

The general structure and operation of the invention will be easily understood from the embodiment shown FIGS. 1-3. In FIG. 1, a cap 2 is shown removed from a filler port 1 provided on an automobile body 3. In FIG. 2, the filler port 1 is closed by the cap 2 and a lid 5 mounted by a hinge 4 to the body 3 is also closed. FIG. 3 is an exploded perspective view showing an essential part of the embodiment.

The filler port 1 opens within a recess 6 formed in part of the outer wall of the body 3, and the lid 5 is hinged to one edge of the recess.

Reference numeral 7 designates a mounting member which is mounted in a through hole 8 formed in a plate-like portion 3a of the body surrounding the filler port 1, numeral 9 a string-like connecting member which can be freely inserted through the mounting member into the interior of the body, and numeral 10 a tube-like cover, in which the connecting member 9 is accommodated when it is inserted into the interior of the body.

The mounting member 7 is a one-piece molding made of a synthetic resin, and has a flange-like head portion 7a, a cylindrical leg portion 7b depending from the underside of the head portion and an elastic locking pawl portion 7c obliquely extending from the outer periphery of the leg portion toward the underside of the head portion 7a. The mounting member 7 is mounted by inserting the leg portion 7b through the through hole 8.

The string-like connecting member 9, like the mounting member 7, is made of synthetic resin, in this embodiment a thermoplastic synthetic resin having high flexibility. It has a main portion 9a, a ring-like portion 9b which is integral with one end of the main portion 9a and is to be fitted in an annular or ring-like groove 11 formed in the cap 2, and an end retainer portion 9c which is integral with the other end of the main portion 9a for retaining the connecting member 9 with respect to the mounting member 7.

The ring-like portion 9b has a V-shaped notch 12 to permit free rotation of the cap 2 with the groove 11 as a guide when fitting it in the groove 11 or after it has been fitted. The notch 12 permits an increase in the diameter of the ring-like portion 9b, thus permitting the fitting of the ring-like portion 9b on the cap 2 and also free rotation of the cap 2 with respect to the ring-like portion 9b.

A plate-like connecting portion 13 connects the ring-like portion 9b and the main portion 9a. The connecting portion 13 is formed on one side with a transverse groove to define a hinge portion 14 having a reduced thickness, about which the connecting portion 13 can be folded.

After the ring-like portion 9b has been fitted in the groove 11 of the cap 2, the connecting member 9 is mounted in the body 3 as follows. The end retainer portion 9c, which is provided at one end of the main portion 9a and has an anchor-like shape, is inserted through a bore 15 of the mounting member 7. When the retainer portion 9c has cleared the bore 15, the connecting member 9 is mounted so that it cannot be detached from the body 3.

The cover 10 serves to protect the main portion 9a of the connecting member 9 inserted through the mounting member into the interior of the body. It consists of a synthetic resin tube having a length greater than the length of the main portion 9a, and is mounted by fitting one open end portion on the leg portion 7b of the mounting member 7.

The outer periphery of the leg portion 7b is provided with retainer ribs to prevent detachment of the fitted cover.

With the embodiment of the invention having the above construction, the cap 2 can be connected to a portion of the body 3 near the filler port 1 by fitting the ring-like portion 9b of the connecting member in the groove 11 of the cap 2 and then passing the end retainer portion 9c at the other end of the main portion 9a of the connecting member through the bore 15 of the mounting member 7.

When fitting the cap 2 on the filler port, the main portion 9a of the connecting member 9 is forced through the mounting member 7 into the interior of the body to be accommodated in the body. When the cap 2 is removed from the filler port, the main portion 9a is withdrawn and hangs with the end retainer portion 9c hooked on the mounting portion 7.

When fitting and removing the cap, it can be freely turned since the ring-like portion 9b is loosely fitted in the groove 11. Thus, the cap can be smoothly fitted and removed. Further, since the connecting portion 13 of the connecting member can be bent or folded perpendicularly about the hinge portion 14, the connecting portion can be smoothly accommodated.

As has been described in the foregoing, according to the invention the cap is held connected by the connecting member to a portion of the automobile body near the fuel-tank filler port, and it is possible to eliminate the possibility of the cap being lost and greatly reduce the likelihookd of someone forgetting to replace and tighten the cap after fuel has been supplied.

When the cap is removed to supply fuel, it hangs beneath the filler port by the connecting member, so that there is no possibility of closing the lid in this state. The cap will thus be noticed by the person who removed it so that its replacement after fuel has been supplied is ensured.

During fitting of the cap on the filler port, the connecting member which has been withdrawn from the bore of the mounting member with the raising of the cap, can be accommodated in the body. Therefore, the connecting member will not obstruct the operation of fitting the cap, and will also not obstruct closing of the lid. Thus, it does not impair the operability. Further, it does not spoil the appearance.

Further, the holding device can be very simply installed by mounting the mounting member in the through hole of the body, fitting the ring-like portion at one end of the connecting member on the cap and passing the other end of the connecting member through the bore of the mounting member.

What is claimed is:

1. A device for holding a fuel-tank filler port cap, comprising:
    a mounting member mounted in a through hole formed in an automobile body near a fuel-tank filler port; and
    a string-like connecting member insertedly retained in said mounting member such that it can be partially withdrawn therefrom, said connecting member being provided at one end with means for retaining it against detachment from said mounting member and provided at the other end with a ring-like portion for holding said cap, said connecting member being retreatedly accommodated into the interior of the automobile body through said mounting member when said cap is fitted and being withdrawn to hold the cap in the hanging state when said cap is removed.

2. The device for holding a fuel-tank filler port cap according to claim 1, wherein said mounting member has a flange-like head portion, a cylindrical leg portion depending from the underside of said head portion and an elastic locking pawl portion obliquely extending from the outer periphery of said leg portion toward the underside of said head portion.

3. The device for holding a fuel-tank filler port cap according to claim 2, which further comprises a tube-like cover fitted on said leg portion.

* * * * *